(12) United States Patent
Oka et al.

(10) Patent No.: US 6,172,670 B1
(45) Date of Patent: *Jan. 9, 2001

(54) METHOD AND APPARATUS FOR SIMULTANEOUS SHAPE-DEPENDENT ACCESS TO PICTURE DATA STORED AT A PLURALITY OF ADDRESSES

(75) Inventors: Masaaki Oka, Kanagawa; Toshiyuki Hiroi, Tokyo, both of (JP)

(73) Assignee: Sony Computer Entertainment, Inc., Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/930,384
(22) PCT Filed: Feb. 6, 1997
(86) PCT No.: PCT/JP97/00295
  § 371 Date: Jan. 5, 1998
  § 102(e) Date: Jan. 5, 1998
(87) PCT Pub. No.: WO97/29427
  PCT Pub. Date: Aug. 14, 1997

(30) Foreign Application Priority Data

Feb. 6, 1996 (JP) .................................................... 8-020330

(51) Int. Cl.[7] ............................... G09G 5/00; G06K 9/46
(52) U.S. Cl. .................... 345/200; 345/118; 382/203; 382/173; 382/260; 382/305; 382/243
(58) Field of Search ................................. 711/150, 153, 711/168, 170, 173; 345/26, 189, 190, 192, 193, 200, 118; 348/714, 716, 718; 382/177, 205, 260, 305, 203, 173, 243; 358/453, 460

(56) References Cited

U.S. PATENT DOCUMENTS

| | | | |
|---|---|---|---|
| 4,283,724 | * 8/1981 | Edwards | 345/26 |
| 4,484,187 | * 11/1984 | Brown et al. | 345/186 |
| 4,864,629 | * 9/1989 | Deering | 382/216 |
| 4,924,415 | * 5/1990 | Winser | 345/422 |
| 5,125,048 | * 6/1992 | Virtue et al. | 382/205 |
| 5,208,875 | * 5/1993 | Virtue et al. | 382/260 |
| 5,488,385 | * 1/1996 | Singhal et al. | 345/3 |
| 5,533,148 | * 7/1996 | Sayah et al. | 382/240 |
| 5,680,178 | * 10/1997 | Takeuchi | 348/581 |

FOREIGN PATENT DOCUMENTS

| | | |
|---|---|---|
| 0 488 286 A2 | 9/1991 | (EP) . |
| 60-221848 | 11/1985 | (JP) . |
| 61-201350 | 9/1986 | (JP) . |
| WO 88/07235 | 9/1988 | (WO) . |
| WO 89/06033 | 6/1989 | (WO) . |

* cited by examiner

Primary Examiner—B. James Peikari
(74) Attorney, Agent, or Firm—Fulwider Patton Lee & Utecht, LLP

(57) ABSTRACT

A control means 101 is responsive to the shape of data inputted by inputting means 32 to control designating means 102 to switch interleaving patterns of addresses of a memory 18 designated for accessing means 103*a* to 103*d*. The designating means 102 designates to the accessing means 103*a* to 103*d* addresses of the memory 18 to be accessed under control by the control means 101. The accessing means 103*a* to 103*d* simultaneously access plural addresses of the memory 18 designated by the designating means 102. By switching to an appropriate interleaving pattern of simultaneously accessible addresses for accessing the memory with a minimum number of accessing operations for performing predetermined data processing operations, the efficiency of data processing may be improved.

14 Claims, 12 Drawing Sheets

METHOD AND APPARATUS FOR SIMULTANEOUS SHAPE-DEPENDENT ACCESS TO PICTURE DATA STORED AT A PLURALITY OF ADDRESSES

BACKGROUND OF THE INVENTION

1. Field of the Invention

This invention relates to a memory accessing method for providing access to a frame buffer by pixel interleaving and a data processing apparatus for performing pre-set data processing by accessing a frame buffer by the memory accessing method. The memory accessing method and the data processing apparatus can be utilized in a video game machine or a graphic computer system such as video equipment employing a computer.

2. Related Art

In a picture generating apparatus for generating data of a picture outputted to and displayed on a display device, such as output picture data for a television receiver, a monitor receiver or a cathode ray tube (CRT) display device, that may be used in a video game device or a graphics computer system, a dedicated drawing device is provided between a central processing unit (CPU) and a frame buffer to permit high-speed processing.

That is, in such a picture generating apparatus, the CPU generating a picture performs geometry processing, such as coordinate transformation, clipping or light source calculations, instead of directly accessing the frame buffer. The CPU then defines a three-dimensional model as a combination of basic unit figures, such as triangular or quadrangular figures, formulates a drawing command for drawing a three-dimensional picture, and sends the drawing command to the drawing device.

For example, if, in the above-described picture generating apparatus, a three-dimensional object is represented, the object is resolved into a plurality of polygons, and a drawing command associated with each polygon is transmitted from the CPU to the drawing device. The drawing device interprets the drawing command sent from the CPU and executes rendering processing of computing colors and Z-values of all pixels making up the polygon from Z-values for writing pixel data in a frame buffer for drawing a picture.

The Z-values represent color data and depth of all pixels making up a polygon. That is, the Z-value provides information representing distance along a depth from a viewing point.

The above-described picture generating device also has the function of executing pixel interleaving by writing a plurality of pixel data at a time to a corresponding plurality of addresses of a frame buffer, which serves as an accessing unit, and the picture generating device is configured to access the frame buffer by this function.

However, with the pixel interleaving performed by the above picture generating device, a plurality of simultaneously accessible addresses are available in each accessing unit.

Therefore, if a picture represented by the plurality of simultaneously accessible addresses and a picture drawn on the frame buffer, that is the shape formed by the data actually desired to be accessed, are not coincident with each other, the number of times that the frame buffer must be accessed is undesirably increased.

Moreover, if the number of times that the frame buffer must be accessed is increased, the performance of the data processing carried out by the picture generating device decreases.

In view of the above-depicted state of the art, the present invention has the following objects.

Specifically, it is an object of the present invention to provide a memory accessing method in which interleaving patterns of simultaneously accessible addresses are selected to allow the memory to be accessed with a minimum number of accessing operations increasing the memory accessing efficiency.

It is another object of the present invention to provide a data processing apparatus in which simultaneously accessible addresses are selected to allow the memory to be accessed with a minimum number of accessing operations for raising the data processing efficiency.

SUMMARY OF THE INVENTION

In one aspect, the present invention provides a memory accessing method for simultaneously accessing a plurality of addresses of a memory wherein addresses to be accessed simultaneously are determined depending on a shape in the memory of data desired to be accessed.

In the memory accessing method according to the present invention, the data may be picture data.

In the memory accessing method according to the present invention, the addresses to be accessed may be determined depending on the aspect ratio of the shape.

In the memory accessing method according to the present invention, the addresses to be accessed may be selected from a plurality of patterns.

In another aspect, the present invention provides a data processing apparatus for performing pre-set data processing by simultaneously accessing a plurality of addresses in a memory including accessing means for simultaneously accessing a plurality of addresses in the memory, and control means for determining the addresses simultaneously accessed by the accessing means depending on the shape of input data.

In the data processing apparatus of the present invention, the data is picture data.

In the data processing apparatus of the present invention, the control means determines the simultaneously accessed addresses depending on the aspect ratio of the shape of the input data.

In the data processing apparatus of the present invention, the control means selects the accessed addresses from a plurality of patterns.

BRIEF DESCRIPTION OF THE DRAWINGS

FIG. 7 illustrates addresses to be accessed obtained by the masking process.

DETAILED DESCRIPTION OF THE PREFERRED EMBODIMENTS

Figure 1:
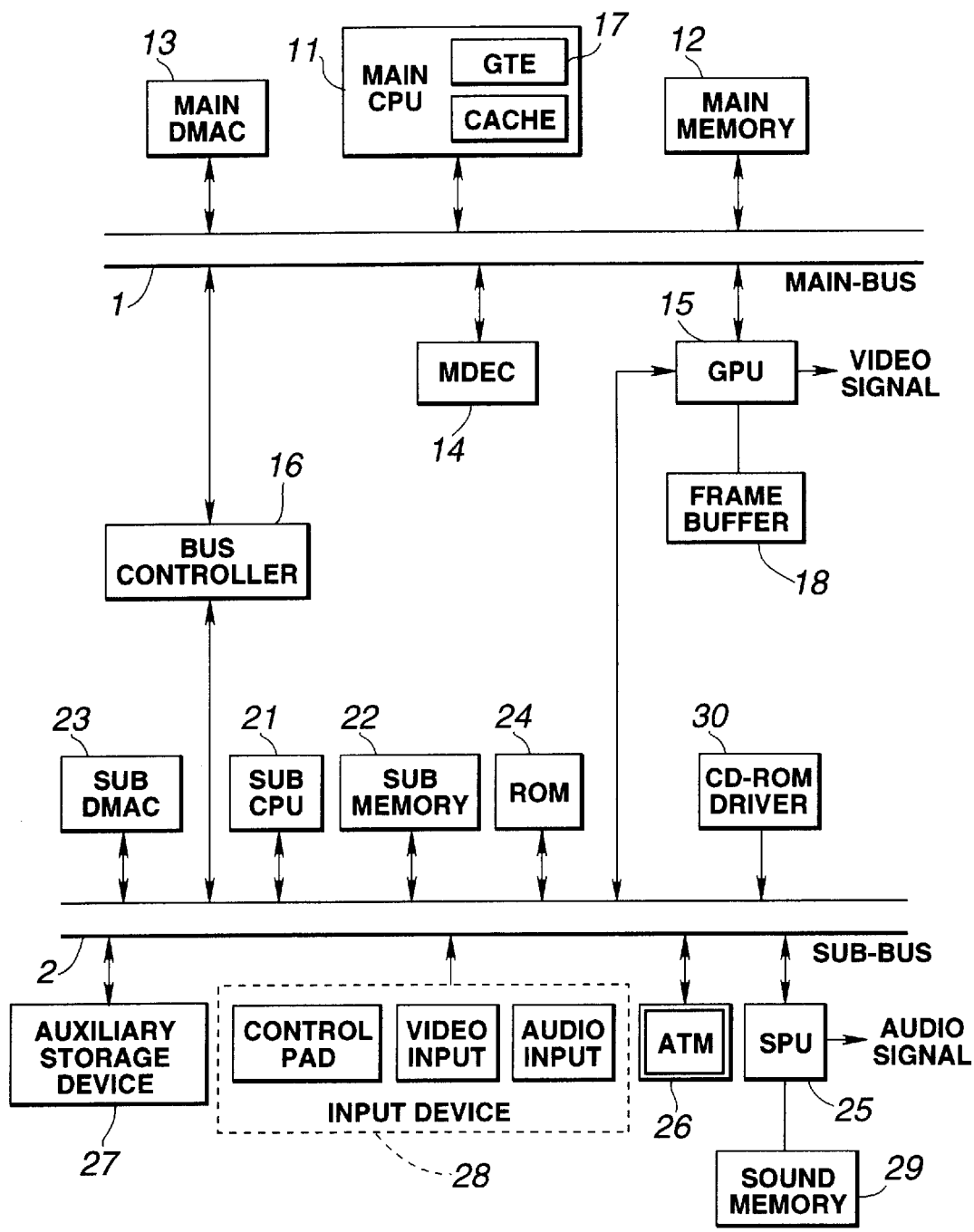
FIG. 1 is a block diagram showing the structure of a video game machine employing a data processing device according to the present invention.

Referring to the drawings, preferred embodiments of the present invention will be explained in detail.

The memory accessing method according to the present invention is carried out by a video game machine configured as shown in FIG. 1. The video game machine is an apparatus employing a data processing device according to the present invention.

The video game machine executes a game in accordance with instructions by the user by reading and executing a game program stored in an auxiliary memory device such as an optical disc, and has two sorts of buses, namely a main bus 1 and a sub-bus 2. The main bus 1 and the sub-bus 2 are interconnected via a bus controller 16.

Connected to the main bus 1 are a central processing unit (CPU) 11, made up of a micro-processor; a main memory 12, made up of a random access memory (RAM); a main dynamic memory access controller or main DMAC 13; a MPEG decoder 14; and a picture processing unit or graphic processing unit (GPU) 15.

Connected to the sub-bus 2 are a subsidiary central processing unit or sub-CPU 21, made up of a microprocessor; a subsidiary memory 22, made up of a random access memory (RAM); a subsidiary dynamic memory accessing controller or sub DMAC 23; a read-only memory (ROM) 24, having stored therein a program, such as an operating system; a sound processing unit (SPU) 25; a communication controller or asynchronous transmission mode (ATM) 26; an auxiliary storage device 27; an input device 28; and a CD-ROM driver 30.

The bus controller 16 is a device on the main bus 1 for switching between the main bus 1 and the sub-bus 2, and is open in an initial state.

The main CPU 11 is a device on the main bus 1 operated by a program in the main memory 12. Since the bus controller 16 is open on start-up, the main CPU 11 reads in a boot program from the ROM 24 on the sub-bus 2 in order to load an application program and necessary data from the auxiliary storage device 27 into the main memory 12 or to devices on the sub-bus 2.

Associated with the main CPU 11 is a geometry transfer engine (GTE) 17 for performing processing such as coordinate transformation. This GTE 17 has a parallel computing mechanism for carrying out plural computing processing operations in parallel and is responsive to a request for computing processing from the CPU 11 in order to carry out fast processing operations, such as coordinate transformation, light source calculations, matrix or vector operations. Based on the results of computer processing operations by the GTE 17, the main CPU 11 defines a three-dimensional model as a combination of basic unit figures, such as triangles or quadrangles, formulates a drawing command associated with each polygon for drawing a three-dimensional picture, and packetizes the drawing command in order to route the resulting command packet to the GPU 15.

The main DMAC 13 is a device on the main bus 1 for performing control such as DMA transfer on the devices on the main bus 1. If the bus controller 16 is open, the main DMAC 13 also controls the devices on the sub-bus 2.

The GPU 15 is a device on the main bus 1 functioning as a rendering processor. This GPU 15 interprets the drawing command sent from the main CPU 11 or main DMAC 13 as a command packet and performs rendering processing operations of calculating Z-values and colors of all pixels making up a polygon for writing pixel data in the frame buffer 18.

The GPU 15 will be explained subsequently in detail.

The MDEC 14 is an I/O connection device operable in parallel with the main CPU 11 and functions as a picture expansion engine. The MDEC 14 decodes picture data compressed and encoded by orthogonal transforms, such as discrete cosine transforms.

The sub-CPU 21 is a device on the sub-bus 2 operating in accordance with a program on the sub-memory 22.

The sub-DMAC 23 is a device on the sub-bus 2 for performing control such as DMAC transfer for devices on the sub-bus 2. This sub-DMAC 23 can acquire bus rights only when the bus controller 16 is closed.

The SPU 25 is a device on the sub-bus 2 functioning as a sound processor. This SPU 25 is responsive to a sound command sent as a command packet from the sub-CPU 21 or sub-DMAC 23 as a command packet to read out sound source data from the sound memory 29 to output the read-out data.

The ATM 26 is a communication device on the sub-bus 2.

The auxiliary storage device 27 is a data input/output device on the sub-bus 2 and is made up of a non-volatile memory, such as a flash memory. This auxiliary storage device 27 temporarily stores memory data such as game progress or scores.

The input device 28 is an input device from other equipment, such as a control pad on the sub-bus 2, manmachine interface, picture input or speech input.

The CD-ROM driver 30 is an input device on the sub-bus 2 and reproduces an application program and necessary data from the CDROM.

That is, in the above-described video game machine, the geometry processing system which executes geometry processing, such as coordinate transformation, clipping or light source calculations, formulating a drawing command for defining a three-dimensional model as a combination of basic unit figures (polygons) such as triangles or quadrangles for drawing a three-dimensional picture, and sending out the drawing command associated with each polygon as a command packet to the main bus 1, is made up of the main CPU 11 and the GTE 17 on the main bus 1. Also, in the video game machine, the rendering processing system for formulating pixel data of each polygon based on the drawing command from the geometry processing system, for writing a figure in the frame buffer 18 by way of rendering processing, and for drawing a figure in the frame buffer 18, is constituted by the GPU 15.

The above-mentioned GPU 15 is explained in detail below.

Figure 2:
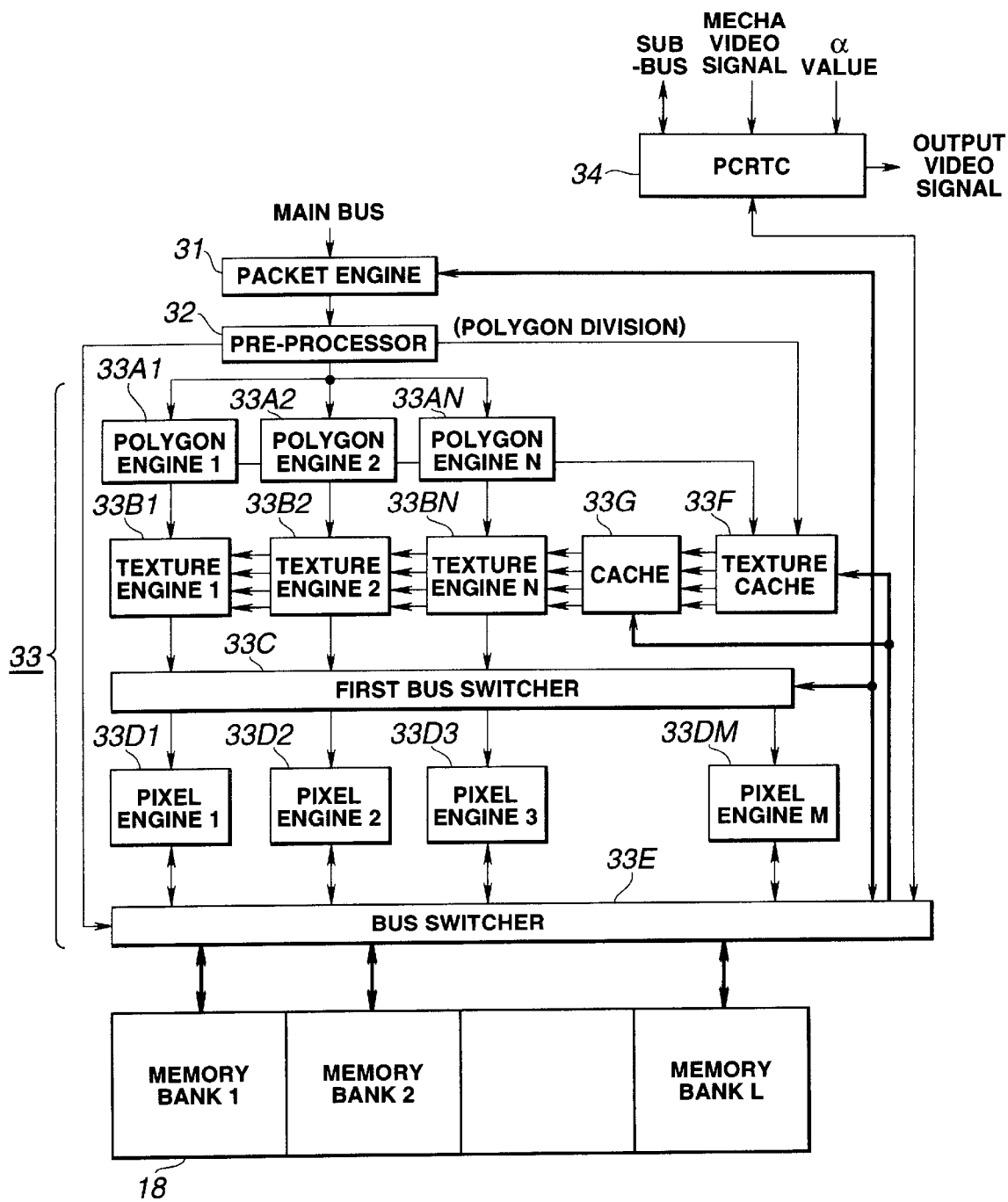
FIG. 2 is a block diagram showing the structure of a picture processing device of the video game machine and a frame buffer.

Referring to FIG. 2, the GPU 15 includes a packet engine 31 connected to the main bus 1 shown in FIG. 1 and performs the functions of rendering processing by the pre-processor 32 and the drawing engine 33 writing pixel data for each polygon in the frame buffer 18 in accordance with the drawing command sent as a command packet from the main CPU 11 or main DMAC 13 shown in FIG. 1 over the main bus 1 to the packet engine 31; reading out pixel data of the picture drawn in the frame buffer 18; and furnishing the read-out pixel data via CRT controller 34 as video signals to a television receiver or a monitor receiver, not shown.

The packet engine 31 develops the command packet sent from the main CPU 11 or main DMAC 13 shown in FIG. 1 over the main bus 1 on a register, not shown.

The pre-processor 32 generates polygon data in accordance with the drawing command sent to the packet engine 31 as command packets and performs pre-processing on the polygon data, such as polygon division as is later explained, while generating various data such as apex point coordinate information for the respective polygons required by the drawing engine 33, address information such as texture or MIP map texture, or control information, such as for pixel interleaving.

The drawing engine 33 includes N polygon engines 33A1, 33A2, ..., 33AN, connected to the pre-processor 32, N texture engines 33B1, 33B2, ..., 33BN, connected to the polygon engines 33A1, 33A2, ..., 33AN, a first bus switcher 33C, connected to the texture engines 33B1, 33B2, ..., 33BN, M pixel engines 33D1, 33D2, ..., 33DM, connected to the first bus switcher 33C, a second bus switcher 33E, connected to the pixel engines 33D1, 33D2, ..., 33DM, a texture cache 33F connected to the second bus switcher 33E, and a CLUT cache 33G connected to the texture cache 33F.

In the drawing engine 33, the N polygon engines 33A1, 33A2, ... 33AN sequentially generate polygons in accordance with the drawing command on the basis of the polygon data pre-processed by the pre-processor 32 for performing parallel shading processing from one polygon to another.

The N texture engines 33B1, 33B2, ..., 33BN perform texture mapping or MIP map processing in parallel, based on the texture data supplied from the texture cache 33F via color lookup table (CLUT) cache 33G, on the polygons generated by the polygon engines 33A1, 33A2, ..., 33AN.

The pre-processor 32 furnishes the address information, such as texture or MIP map texture, associated with the polygons processed by the N texture engines 33B1, 33B2 ..., 33BN, to the texture cache 33F. Based on the above address information, the necessary texture data is transferred from the texture area on the frame buffer 18. CLUT data to be referred to during texture drawing is transferred to the CLUT cache 33G from the CLUT area on the frame buffer 18.

The polygon data, processed with texture mapping or MIP map processing by the N texture engines 33B1, 33B2, ..., 33BN, are transferred via first bus switcher 33C to M pixel engines 33D1, 33D2, ..., 33DM.

The M pixel engines 33D1, 33D2, ..., 33DM perform various picture processing operations, such as Z-buffer processing or anti-aliasing processing, in parallel, for generating M pixel data.

The M pixel data, generated by the M pixel engines 33D1, 33D2, ..., 33DM, are written in the frame buffer 18 via second bus switcher 33E.

The pixel interleaving control information from the pre-processor 32 is fed to the second bus switcher 33E. The second bus switcher 33E has a function of performing pixel interleaving processing by selecting L pixel data from the M pixel data generated by the M pixel engines 33D1, 33D2, ..., 33DM in accordance with the above control information for writing M pixel data using the M storage locations conforming to the shape of the polygon drawn on the frame buffer 18 as an accessing unit.

The pixel interleaving processing performed by the second bus switcher 33E will be explained subsequently.

The drawing engine 33 generates and writes all pixel data of each polygon in the frame buffer 18, based on the polygon data preprocessed by the pre-processor 32, for drawing a picture, defined as the combination of the polygons by the drawing command, on the frame buffer 18.

Thus the pixel data of the picture drawn on the frame buffer 18 is read out by the second bus switcher 33E so as to be furnished via CRTC 34 as video signals to a television receiver or to a monitor receiver, not shown.

The pixel interleaving processing performed by the above-mentioned second bus switcher 33E is now specifically explained.

Figure 3:
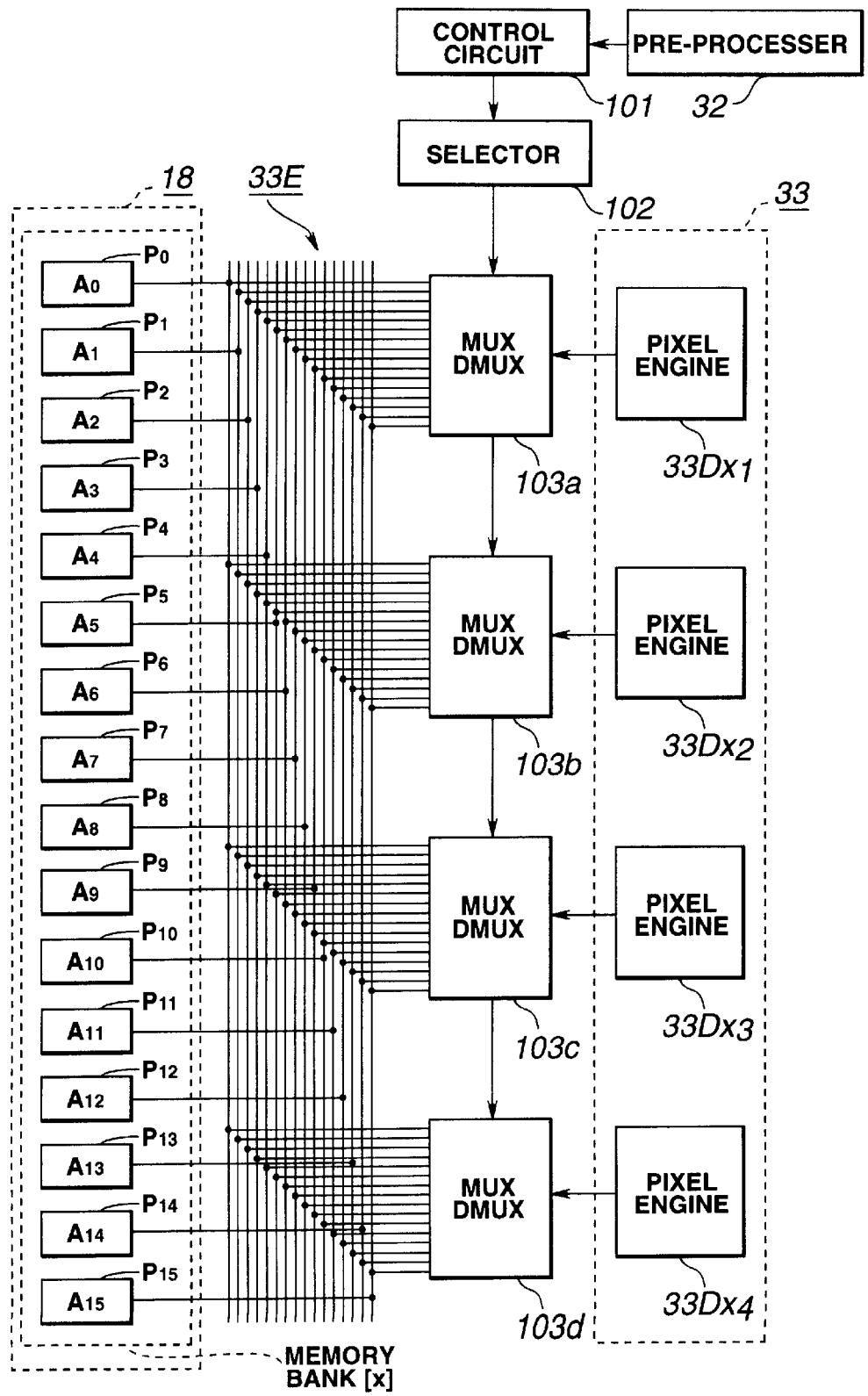
FIG. 3 is a block diagram showing the structure of a second bus switcher of the picture processing device.

Referring to FIG. 3, the second bus switcher 33E includes a control circuit 101 fed with an output of the pre-processor 32 shown in FIG. 2, a selector 102 fed with an output of the control circuit 101, and a plurality of multiplexer/demultiplexers (MUX/DMUX) 103a, 103b, 103c, 103d, ... each fed with an output of the selector 102.

The MUX/DMUX 103a, 103b, 103c, 103d, ... are connected to the frame buffer 18 and to the drawing engine 33 shown in FIG. 2.

The frame buffer 18 is made up of a plurality of memory banks [1], [2], ..., [X], ..., [L], as shown in FIG. 2. Each of the memory banks [1], [2], [X], ..., [L] is made up of a rectangular area represented by 16 addresses (interleaving patterns), so that the 16 addresses can be accessed simultaneously.

Therefore, the memory bank [X], for example, of the frame buffer 18, has 16 input/output ports $P_0$ to $P_{15}$ for accessing the addresses $A_0$ to $A_{15}$. Of the MUX/DMUX 103a, 103b, 103c, 103d, ..., the four MUX/DMUX 103a, 103b, 103c, 103d are each connected to 16 input/output ports $P_0$ to $P_{15}$.

Also, the four MUX/DMUX 103a, 103b, 103c, 103d are connected in association with four pixel engines $33D_{x1}$, $33D_{x2}$, $33D_{x3}$ and $33D_{x4}$ of the drawing engine 33.

Since the memory banks other than the memory bank [X] are configured similarly to the above-mentioned memory bank [X], the detailed description of the other memory banks is omitted for simplicity. The accessing operation performed by the second bus switcher 33E on the other memory banks is similar to that performed by the second bus switcher 33E on the memory bank [X], as is explained below. Therefore, in the following description, only the accessing operation performed by the second bus switcher 33E on the memory bank [X] is explained.

First, a series of operations by the second bus switcher 33E is explained.

Figure 4:
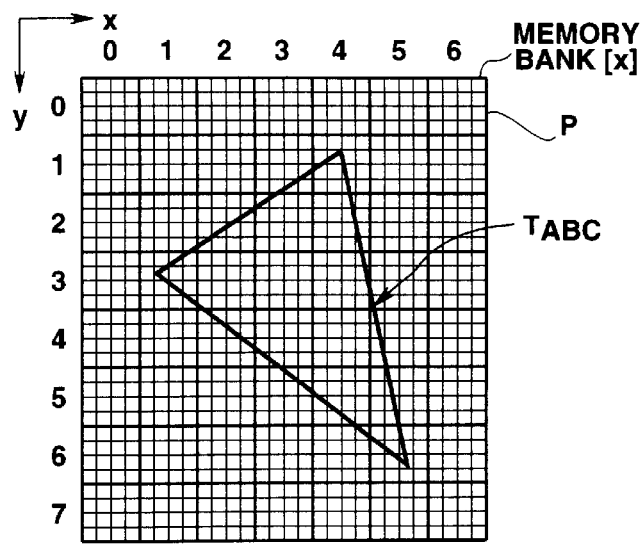
FIG. 4 illustrates accessing the inside of a first polygon drawn on the basis of data in a memory bank of the frame buffer.

If, for example, the shape of a polygon drawn to encompass the data in the memory bank [X] is a triangle $T_{ABC}$ (the shape of the first polygon) as shown in FIG. 4, the control circuit 101 is first fed from the preprocessor 32 with the pixel interleaving control information.

Based on the pixel interleaving control information from the pre-processor 32, the control circuit 101 selects an interleaving pattern, used for accessing the inside of the triangle $T_{ABC}$, such as, for example, a (4×4) interleaving pattern.

The method for selecting the interleaving pattern in the control circuit 101 will be later explained in detail.

Of the plurality of interleaving patterns that can be formed on data in the memory bank [X], such an interleaving pattern to be accessed, that is, an interleaving pattern that permits the data encompassed inside of the triangle $T_{ABC}$ to be accessed in its entirety, is determined by the control circuit 101, with the aid of a (4×4) interleaving pattern.

Figure 5:
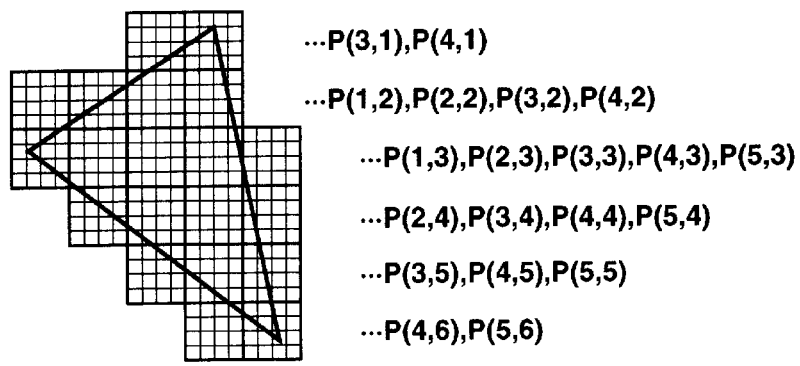
FIG. 5 illustrates an interleaving pattern to be accessed when accessing the inside of a first polygon.

Thus, in the triangle $T_{ABC}$, if each interleaving pattern on the memory bank [X] is indicated by P (pattern index in the x-direction and pattern index in the y-direction), a sum total of 20 interleaving patterns specified by $$P(x, y) = P(3, 1),\ P(4, 1),$$
$$P(1, 2),\ P(2, 2),$$
$$P(3, 2),\ P(4, 2),$$
$$P(1, 3),\ P(2, 3),$$
$$P(3, 3),\ P(4, 3),$$
$$P(5, 3),\ P(2, 4),$$
$$P(3, 4),\ P(4, 4),$$
$$P(5, 4),\ P(3, 5),$$
$$P(4, 5),\ P(5, 5),$$
$$P(4, 6),\ P(5, 6)$$

are determined, as shown in FIG. 5.

The control circuit 101 routes the pattern information specifying the 20 interleaving patterns, determined as described above, to the selector 102 on the basis of the interleaving pattern. When performing memory accessing on an address basis, the control circuit 101 routes the mask information corresponding to the shape of the triangle $T_{ABC}$ to the selector 102.

Based on the pattern information supplied from the control circuit 101 on the basis of the interleaving pattern, the selector 102 designates the address corresponding to the (4×4) interleaving pattern P to be accessed by the MUX/DMUX 103a, 103b, 103c and 103d.

Figure 6:
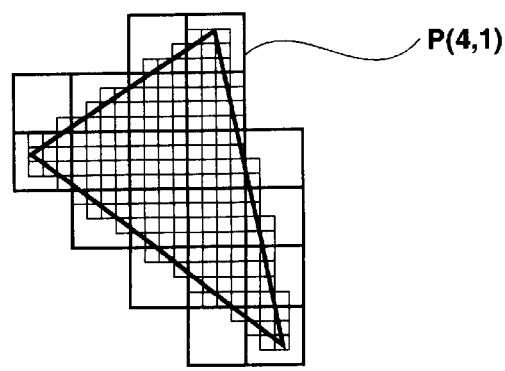
FIG. 6 illustrates a masking process for accessing the inside of the first polygon on an address basis.
Figure 7:
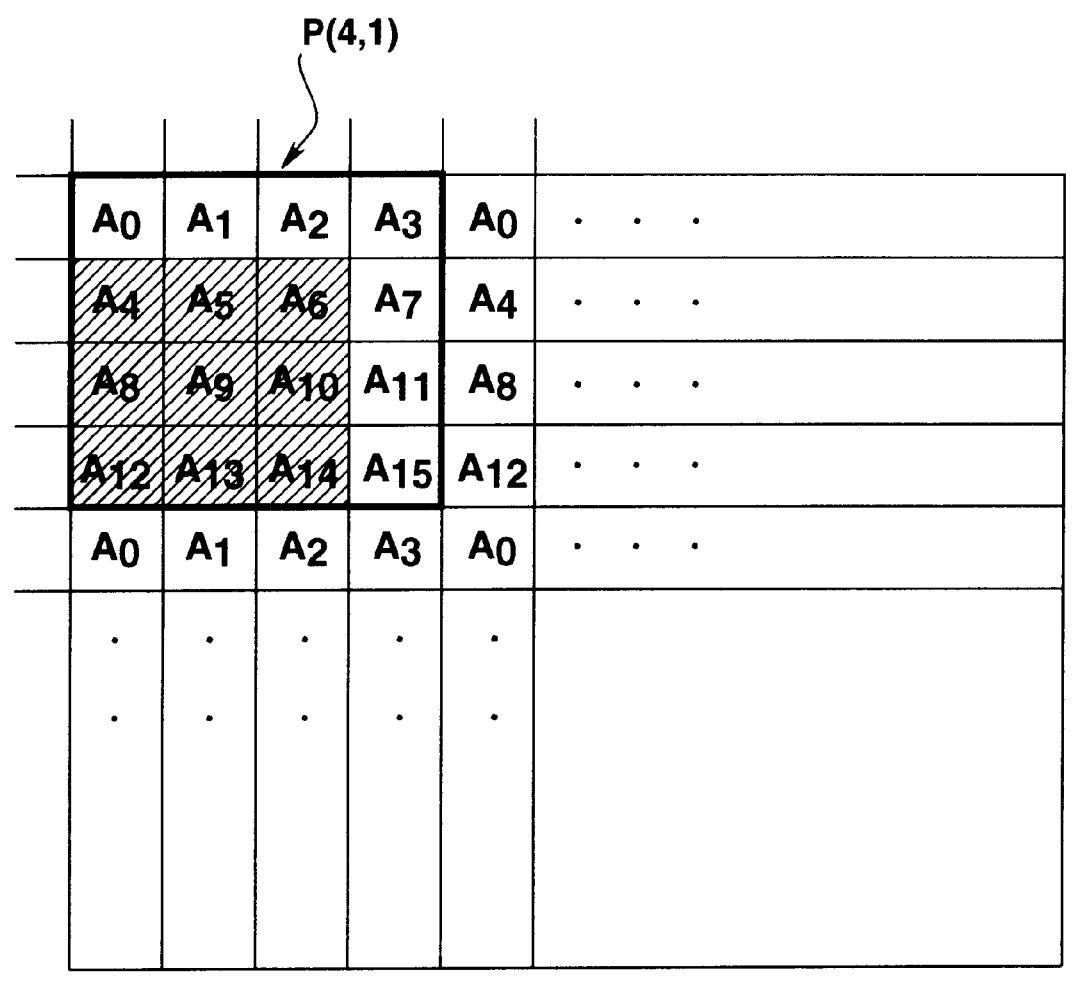

If fed with the mask information from the control circuit 101, the selector 102 designates for MUX/DMUX 103a to 103d the accessing addresses obtained as a result of masking performed in the (4×4) interleaving patterns P, on the basis of the masking information, as shown in FIG. 6. Thus, of the addresses $A_0$ to $A_{15}$ in the interleaving pattern specified by P(4,1) shown in FIG. 6, the addresses to be accessed, obtained as the result of masking, are A4, A5, A6, A8, A9, A10, A13, A14 and A15, shown shaded in FIG. 7.

The MUX/DMUX 103a, 103b, 103c and 103d access the addressees $A_0$ to $A_{15}$ of the memory bank [X] designated by the selector 102.

The pixel engines $33D_{x1}$, $33D_{x2}$, $33D_{x3}$ and $33D_{x4}$ output pixel data to the MUX/DMUX 103a, 103b, 103c and 103d, respectively, as explained previously.

Thus the MUX/DMUX 103a accesses the address designated by the selector 102 to write pixel data from the pixel engine Xa, via one of the input/output ports $P_0$ to $P_{15}$ corresponding to the address designated by the selector 102, in an area of the memory bank [X] designated by the above address.

The MUX/DMUX 103a accesses the address designated by the selector 102 to read out data written in the area designated by the address of the memory bank [X] via one of the input/output ports $P_0$ to $P_{15}$ corresponding to the above address. The MUX/DMUX 103a performs predetermined processing on the data read out from the memory bank [X].

Since the operation of the MUX/DMUX 103b to 103d is similar to the above-described operation of the MUX/DMUX 103a, detailed description therefor is omitted.

The method for selecting the interleaving patterns in the above-described control circuit 101 is now specifically explained.

Figure 8:
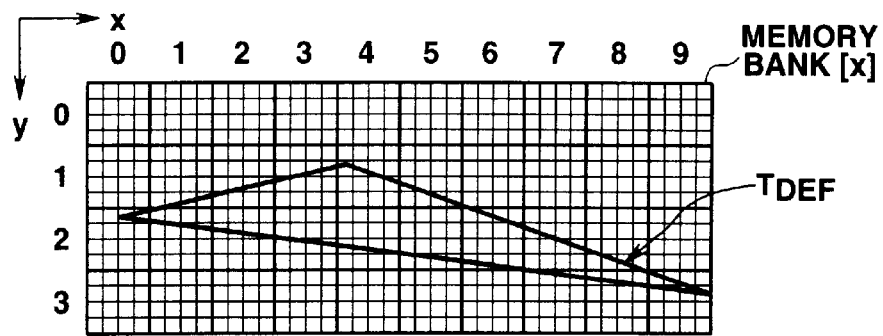
FIG. 8 illustrates accessing the inside of the shape of a second polygon drawn on the basis of data in a memory bank of the frame buffer with a (4×4) interleaving pattern.

First, the number of times that the inside of a transversely elongated triangle $T_{DEF}$ (the shape of a second polygon), the shape of a polygon encompassing data in the memory bank [X] shown in FIG. 8 must be accessed with a (4×4) interleaving pattern P is explained.

Figure 9:
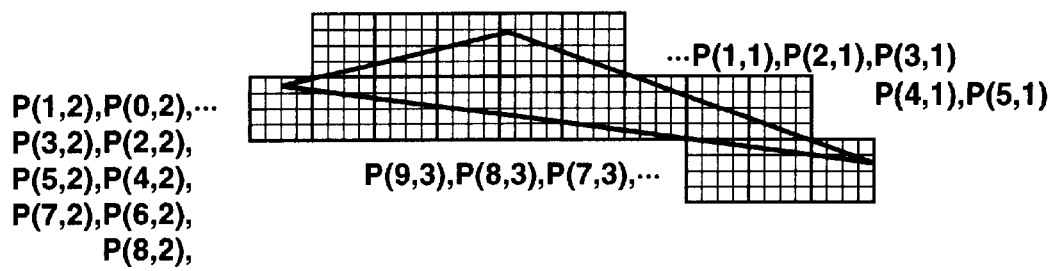
FIG. 9 illustrates accessing the inside of the second polygon with the (4×4) interleaving pattern.

In this case, the interleaving patterns to be accessed are:

$$P(x, y) = P(1, 1),\ P(2, 1),$$
$$P(3, 1),\ P(4, 1),$$
$$P(5, 1),\ P(0, 2),$$
$$P(1, 2),\ P(2, 2),$$
$$P(3, 2),\ P(4, 2),$$
$$P(5, 2),\ P(6, 2),$$
$$P(7, 2),\ P(8, 2),$$
$$P(7, 3),\ P(8, 3),$$
$$P(9, 3),$$

providing a total of 17, as shown in FIG. 9.

That is, in accessing the data encompassed by inside of the triangle $T_{DEF}$ with the (4×4) interleaving pattern, the number of times that the inside of the triangle $T_{DEF}$ must be accessed to access the data in its entirety is 17.

Figure 10:
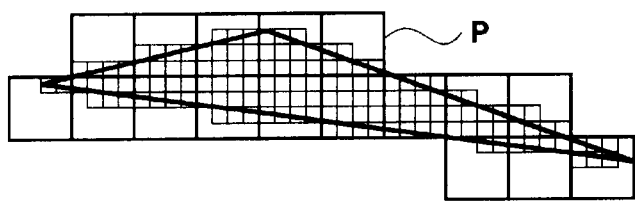
FIG. 10 illustrates the masking process when accessing the inside of the second polygon on the basis of the (4×4) interleaving pattern.

In accessing memory on an address basis, only the required memory addresses need to be accessed by carrying out the masking with the (4×4) interleaving pattern P, as in the case of accessing the data encompassed by the above-mentioned triangle $T_{ABC}$, as shown in FIG. 10.

Figure 11:
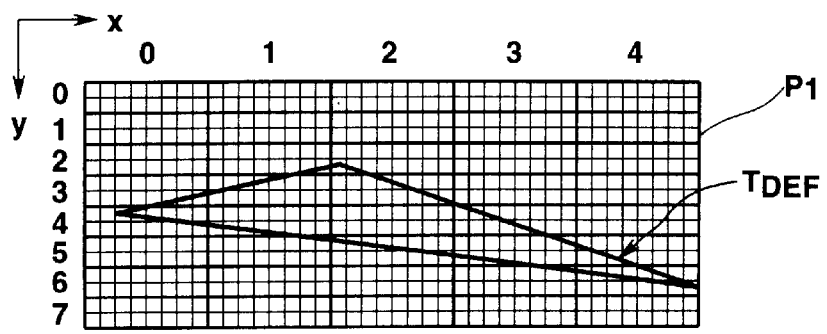
FIG. 11 illustrates accessing the inside of the second polygon with a (8×2) interleaving pattern.
Figure 12:
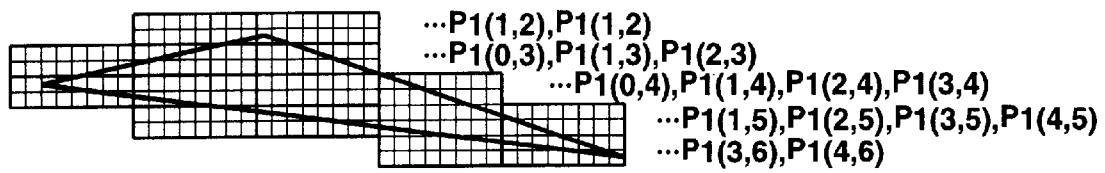
FIG. 12 illustrates accessing the inside of the second polygon with the (8×2) interleaving pattern.

Then, if the inside of the triangle $T_{DEF}$ is accessed with an (8×2) interleaving pattern, as shown in FIG. 11, the interleaving patterns to be accessed are $$P(x, y) = P_1(1, 2), \ P_1(2, 2),$$
$$P_1(0, 3), \ P_1(1, 3),$$
$$P_1(2, 3), \ P_1(0, 4),$$
$$P_1(1, 4), \ P_1(2, 4),$$
$$P_1(3, 4), \ P_1(1, 5),$$
$$P_1(2, 5), \ P_1(3, 5),$$
$$P_1(4, 5), \ P_1(3, 6),$$
$$P_1(4, 6),$$

providing a total of 15, as shown in FIG. 12.

That is, if the data encompassed by the inside of the triangle $T_{DEF}$ is accessed with the (8×2) interleaving pattern, the number of times that the data must be accessed in order to access the entire amount of data within the triangle $T_{DEF}$ is 15.

Figure 13:
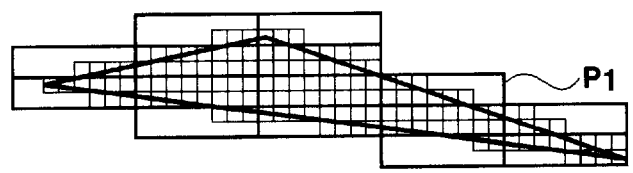
FIG. 13 illustrates the masking process when accessing the inside of the second polygon on an address basis with the (8×2) interleaving pattern.

In accessing memory on an address basis, masking is performed with the (8×2) interleaving pattern $P_1$ as in the case of accessing the data encompassed by the triangle $T_{ABC}$ as described above, as shown in FIG. 13, so that only the needed memory addresses need to be accessed.

Figure 14:
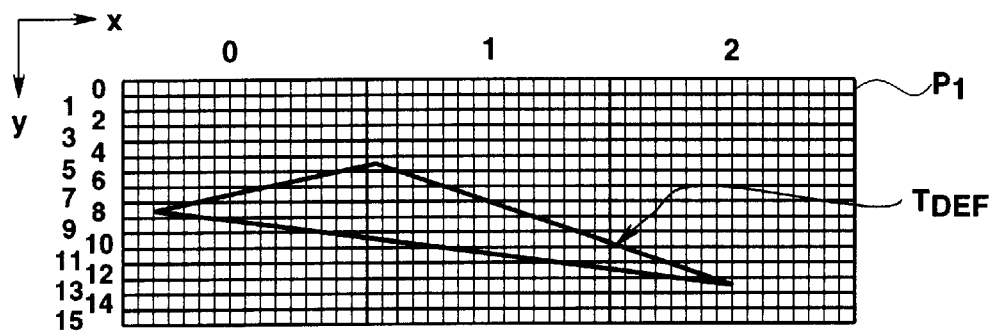
FIG. 14 illustrates accessing the inside of the second polygon with a (16×1) interleaving pattern.
Figure 15:
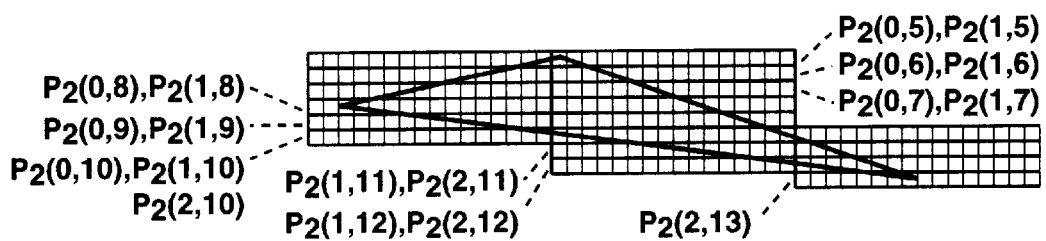
FIG. 15 illustrates accessing the inside of the second polygon with a (1×1) interleaving pattern.

Then, if the data encompassed by the inside of the triangle $T_{DEF}$ is accessed with a (16×1) interleaving pattern, as shown in FIG. 14, the interleaving patterns to be accessed are $$P_2(x, y) = P_2(0, 5), \ P_2(1, 5),$$
$$P_2(0, 6), \ P_2(1, 6),$$
$$P_2(0, 7), \ P_2(1, 7),$$
$$P_2(0, 8), \ P_2(1, 8),$$
$$P_2(0, 9), \ P_2(1, 9),$$
$$P_2(0, 10), \ P_2(1, 10),$$
$$P_2(2, 10), \ P_2(1, 11),$$
$$P_2(2, 11), \ P_2(1, 12),$$
$$P_2(2, 12), \ P_2(2, 13),$$

providing a total of 18, as shown in FIG. 15.

That is, if the data encompassed by the inside of the triangle $T_{DEF}$ is accessed with the (16×1) interleaving pattern, the number of times that the data must be accessed in order to access the entire amount of data encompassed within the inside of the triangle $T_{DEF}$ is 18.

Figure 16:
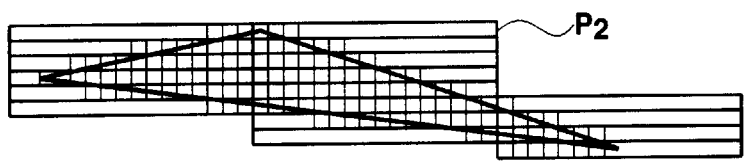
FIG. 16 illustrates the masking process when accessing the inside of the second polygon on an address basis with the (16×1) interleaving pattern.

In accessing memory on an address basis, masking is performed with the (16×1) interleaving pattern $P_2$ as in the case of accessing the triangle $T_{ABC}$ as described above, as shown in FIG. 16, so that only the needed memory addresses need to be accessed.

As described above, the number of times required to access the data encompassed by the inside of the triangle $T_{DEF}$ with the (4×4) interleaving pattern P is 17; while the number of times required to access the data encompassed by the inside of the triangle $T_{DEF}$ with the (8×2) interleaving pattern $P_1$ is 15; and the number of time required to access the data encompassed by the inside of the triangle $T_{DEF}$ with the (16×1) interleaving pattern $P_2$ is 18. Thus, the number of times required to access the data encompassed by the inside of the triangle $T_{DEF}$ with the (8×2) interleaving pattern $P_1$ represents the minimum number of times required to access the data encompassed by the polygon. Thus it can be seen that a proper interleaving pattern for the triangle $T_{DEF}$ is the (8×2) interleaving pattern P1.

Thus, for switching the interleaving pattern used for accessing the memory bank [X] to a proper interleaving pattern in keeping with the shape of the polygon encompassing the data to be accessed, the control circuit 101 executes the following processing operations.

If, for example, the shape of a polygon encompassing data in the memory bank [X] is a triangle $T_{HIJ}$, the control information for pixel interleaving is supplied from the pre-processor 32 to the control circuit 101, as described above. For example, referring to FIG. 17, the control information for pixel interleaving is such information as the xy coordinates H (Xh, Yh), I (Xi, Yi) or J (Xj, Yj) of three apex points of the triangle $T_{HIJ}$.

Figure 17:
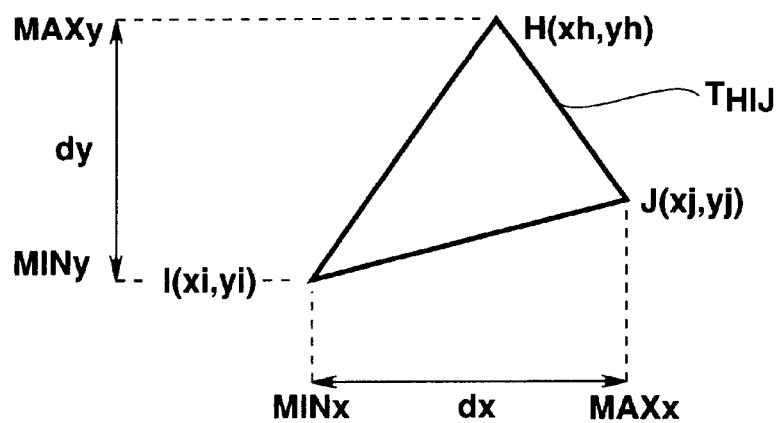
FIG. 17 illustrates computing the aspect ratio of the polygon drawn on the basis of addresses in a memory bank of the frame buffer.

The control circuit 101 then finds, using the control information for pixel interleaving from the pre-processor 32, the aspect ratio R of the triangle $T_{HIJ}$, based on the equations:

$$R=dy/dx=(MAXx-MINx)/(MAXy-MINy)$$

where MAXx and MINx are maximum and minimum values in the X-direction, respectively, and MAXy and MINy are maximum and minimum values in the Y-direction, respectively, as shown in FIG. 17.

In the triangle $T_{HIJ}$,

MAXx=Xj

MINx=Xi

MAXy=Yh

MINy=Yi.

Figure 18:
FIG. 18 is a pattern diagram showing five interleaving patterns each having 16 addresses.
Figure 18:
Figure 18:
Figure 18:
Figure 18:

Depending on the aspect ratio R thus found, the control circuit 101 selects one of five interleaving patterns Pa to Pe of (1×16), (2×8), (4×4), (8×2) and (16×1), as shown in FIG. 18, and switches the interleaving pattern used in accessing data encompassed by the inside of the triangle $T_{HIJ}$ to be the selected interleaving pattern.

The control circuit 101 has a table of ranges of aspect ratio R and corresponding appropriate interleaving patterns (Table 1). In this table the predetermined proper interleaving patterns are associated with various values of the aspect ratio R, in which the interleaving patterns minimize the number of times that data encompassed within the polygon must be accessed. Thus, using the above table, the control circuit 101 selects a proper interleaving pattern associated with the aspect ratio R found as described above.

TABLE 1

| aspect ratio R | interleaving pattern |
| --- | --- |
| ~0.1 | Pa (16 × 1) |
| 0.1 ~ 0.5 | Pb (8 × 2) |
| 0.5 ~ 2.0 | Pc (4 × 4) |
| 2.0 ~ 8.0 | Pd (2 × 8) |
| 8.0~ | Pe (1 × 16) |

In the second bus switcher 33E, an appropriate one of five interleaving patterns Pa to Pe shown in FIG. 18 is selected responsive to the shape of the polygon used to encompass data in the memory bank [X], which is then accessed with the selected interleaving pattern, so that the polygon can be used to access data in the memory bank [X] with the minimum number of accessing operations. Thus it is possible for the second bus switcher 33E to effect memory accessing efficiently.

The GPU 15 accesses the frame buffer 18 by the second bus switcher 33E aimed at raising the memory accessing efficiency, for performing various data processing operations, as described above, for realizing efficient data processing operations.

Figure 19:
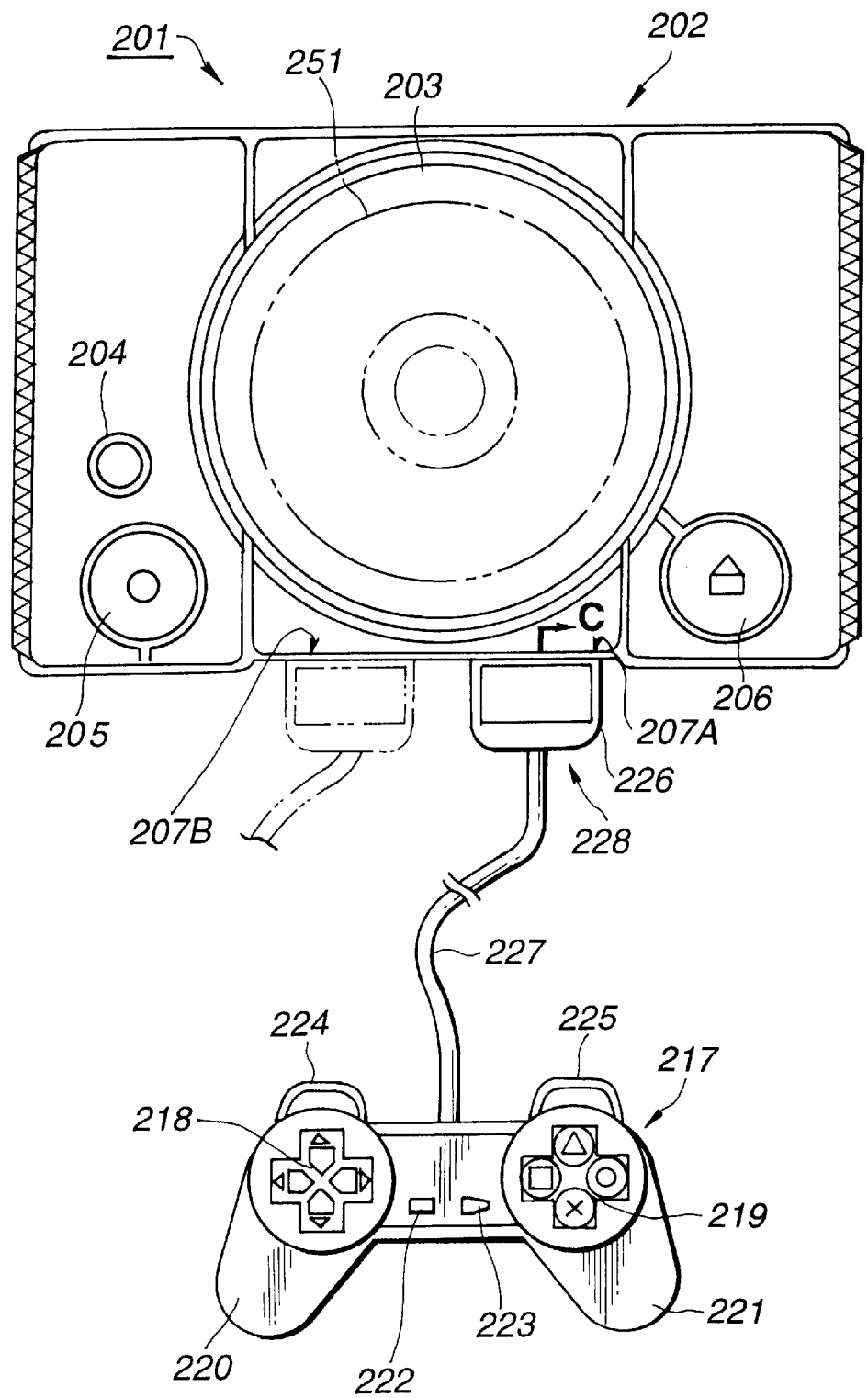
FIG. 19 is a plan view showing a video game machine according to the present invention.
Figure 20:
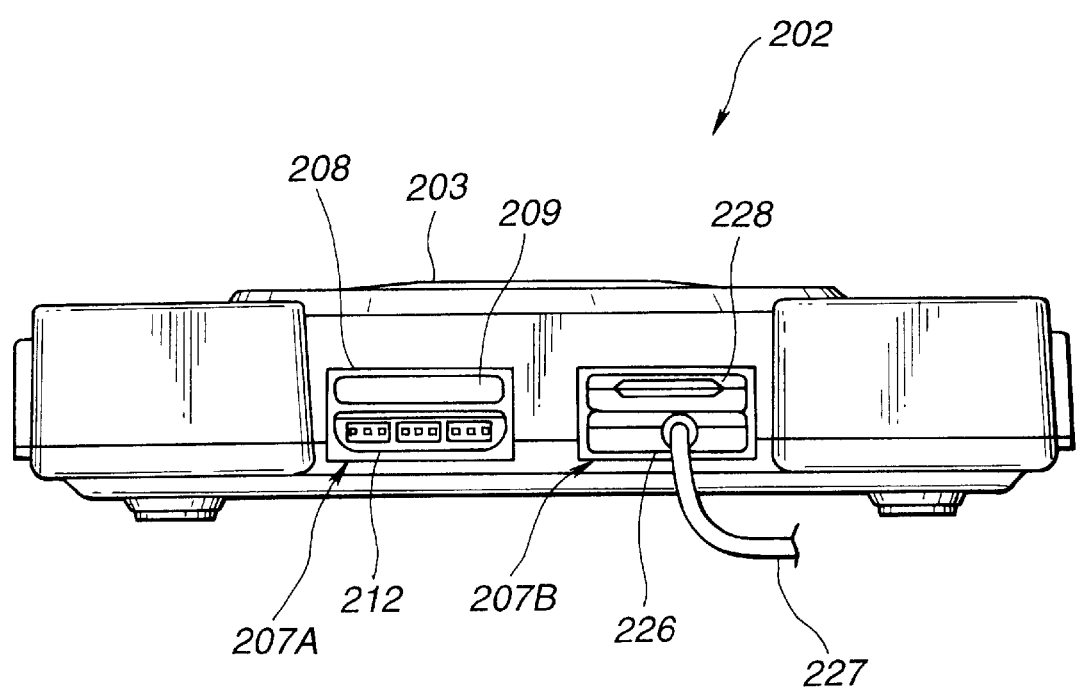
FIG. 20 is a rear view of the video game machine.
Figure 21:
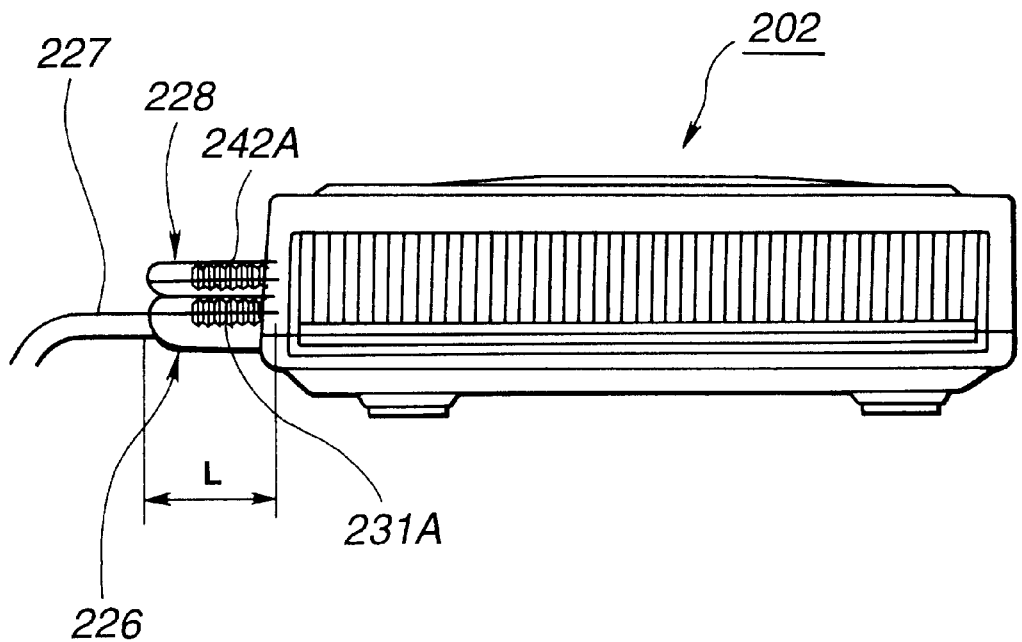
FIG. 21 is a side view showing the video game machine.

A video game machine embodying the present invention is configured as shown for example in a plan view in FIG. 19, a front view in FIG. 20 and in a side view in FIG. 21.

Figure 22:
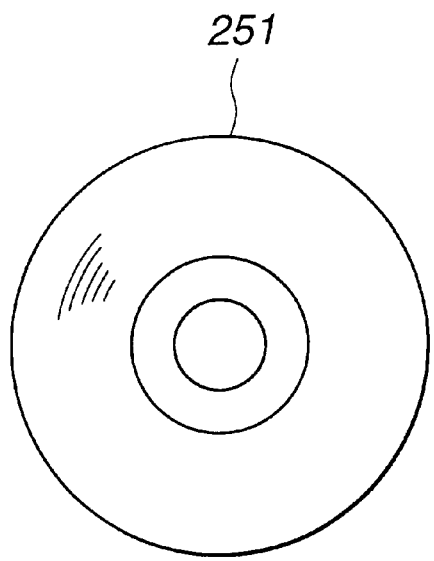
FIG. 22 is a plan view of a CD-ROM loaded on the video game machine.

That is, the present video game machine 201 is basically made up of a main body member 202 and an operating device 217 connected to the main body member 202 via a cable 227, as shown in FIG. 19. At a mid portion on the upper surface of the main body member 202 is mounted a disc loading unit 203 within which is loaded a CD-ROM 251 shown in FIG. 22. On the left side of the disc loading unit 203 are mounted a power source switch 205 operated for turning on or off the device and a reset switch 204 operated for transiently resetting the game. On the right side of the disc loading unit 203 is mounted a disc actuating switch 206 operated for mounting or dismounting the CD-ROM 251 with respect to the disc loading unit 203.

On the front side of the main body member 202 are mounted connecting portions 207A, 207B, as shown in FIG. 20. These connecting portions 207A, 207B are provided with a connection terminal 226 provided on the foremast part of the cable 227 derived from the operating device 217 and a connection terminal inserting portion 212 for connecting a recording device 228, such as a memory card, and a recording/inserting portion 208. That is, two each of the operating devices 217 and recording devices 228 can be connected to the main body member 202.

The front view in FIG. 20 shows the connection terminal portion 226 and the recording device 228 loaded on the right side connecting portion 207B with neither the connecting terminal portion 226 nor the recording device 228 being loaded on the left side connecting portion 207A. The recording inserting portion 208 for loading the recording device 228 therein is provided with a shutter 209. When the recording device 228 is loaded on the main body member 202, the shutter 209 is thrust open by the foremost part of the recording device 228 to effect loading.

The connecting terminal portion 226 has a knurled gripping part 231A for providing an anti-slip effect. Similarly, the recording device 228 has a knurled gripping part 242A for providing an anti-slip effect. Referring to the side view shown in FIG. 21, the connecting terminal portion 226 has a length L substantially equal to a length of the recording device 228.

The operating device 217 has supports 220, 221 that can be gripped with left and right hands. The foremost parts of the supports 220, 221 are provided with operating parts 218, 219, respectively. The operating parts 224, 225 are operated with index fingers of both hands, while the operating parts 218, 219 are operated with thumbs of both hands.

Between the operating parts 218 and 219 are provided a select switch 222 that is actuated for selection during the game and a start switch 223 operated for starting the game.

With the present video game machine 201, the CD-ROM 251 loaded on the disc loading unit 203 is reproduced by the CD-ROM driver 30. The operating device 217 is equivalent to the above-mentioned input device 28, while the recording device 228 is equivalent to the auxiliary storage device 27.

According to the present invention, as described above, the interleaving patterns for accessing plural addresses of data in the memory are switched depending on the shape of a polygon drawn to encompass the data in the memory desired to be accessed, for thereby decreasing the number of memory accessing operations required to access the data even if the shape represented by the plurality of simultaneously accessible addresses is not coincident with the shape of a polygon drawn to encompass the data in the memory desired to be accessed. Thus, the memory can be accessed with a smaller number of accessing operations, thus raising the memory accessing efficiency.

Also, according to the present invention, if the above data is picture data, the number of memory accessing operations can be decreased even in case wherein the shape represented by plural simultaneously accessible addresses is not coincident with the picture drawn on a picture memory.

Also, according to the memory accessing method of the present invention, the interleaving pattern of addresses to be accessed can be switched depending on the aspect ratio of the above-mentioned shape for selecting a proper interleaving pattern of addresses for accessing the data in keeping with the data desired to be accessed. The result is that the memory can be accessed with the minimum number of memory accessing operations.

What is claimed is:

1. A memory accessing method for simultaneously accessing a plurality of addresses of a memory for data storage utilizing a plurality of identical interleaving patterns encompassing coordinates of data desired to be accessed, comprising the steps of:

determining a polygon shape encompassing a portion of the data desired to be accessed; and selecting a shape of the interleaving patterns from a plurality of interleaving patterns based upon said polygon shape of the data portion desired to be accessed.

2. The memory accessing method as claimed in claim 1 wherein the data is picture data and said step of determining a polygon shape of the data portion desired to be accessed comprises determining a polygon shape of a portion of the picture data.

3. The memory accessing method as claimed in claim 1, further comprising the step of determining an aspect ratio of the polygon shape of the data portion desired to be accessed, and wherein the addresses to be accessed are determined based on the aspect ratio of the polygon shape of the data portion to be accessed.

4. The memory accessing method as claimed in claim 3 wherein said step of determining a shape of the interleaving patterns comprises selecting the shape of the interleaving pattern from a plurality of patterns.

5. The memory accessing method as claimed in claim 1, wherein said data is picture data for drawing a picture having a three-dimensional appearance, and said step of determining a polygon shape of the data portion desired to be accessed comprises determining a two dimensional polygon shape from a portion of the picture data.

6. The memory accessing method as claimed in claim 1, further comprising the step of determining an aspect ratio of said polygon shape from coordinates of the data encompassed by said polygon shape, and wherein said step of selecting a shape of the interleaving patterns comprises providing a plurality of interleaving patterns corresponding respectively to a plurality of ranges of aspect ratios, such that said interleaving patterns corresponding respectively to said plurality of ranges of aspect ratios are predetermined to minimize the number of interleaving patterns required to encompass the data encompassed by said polygon shape.

7. A memory accessing apparatus for simultaneously accessing a plurality of addresses of a memory for data storage utilizing a plurality of identical interleaving patterns encompassing input coordinates of data desired to be accessed, the memory accessing apparatus comprising:

inputting means for determining a polygon shape encompassing a portion of the input data desired to be accessed;

accessing means for simultaneously accessing a plurality of addresses on the memory; and control means for selecting a shape of the interleaving patterns that from a plurality of interleaving patterns based on said polygon shape of the input data portion desired to be accessed.

8. The memory accessing apparatus as claimed in claim 7 wherein the input data is picture data.

9. The memory accessing apparatus as claimed in claim 7 wherein the control means comprises means for determining the simultaneously accessed addresses based on the aspect ratio of the polygon shape of the input data portion.

10. The memory accessing apparatus as claimed in claim 9 wherein the control means comprises means for selecting said shape of interleaving patterns from a plurality of patterns.

11. The memory accessing apparatus as claimed in claim 7, wherein said data is picture data for drawing a picture having a three-dimensional appearance, and said inputting means comprises means for determining a two dimensional polygon shape from a portion of the picture data.

12. The memory accessing apparatus as claimed in claim 7, further comprising means for determining an aspect ratio of said polygon shape from coordinates of the data encompassed by said polygon shape, and wherein means for selecting a shape of the interleaving patterns comprises means for providing a plurality of interleaving patterns corresponding respectively to a plurality of ranges of aspect ratios, such that said interleaving patterns corresponding respectively to said plurality of ranges of aspect ratios are predetermined to minimize the number of interleaving patterns required to encompass the data encompassed by said polygon shape.

13. A memory accessing method for simultaneously accessing a plurality of addresses of a memory for pixel data storage utilizing a plurality of identical interleaving pixel patterns encompassing coordinates of pixel data addresses desired to be accessed, comprising the steps of:

determining a polygon shape encompassing a portion of the pixel data desired to be accessed;

determining an aspect ratio of said polygon shape from coordinates of the pixel data encompassed by said polygon shape;

providing a plurality of interleaving pixel patterns corresponding respectively to a plurality of ranges of aspect ratios, such that said interleaving pixel patterns corresponding respectively to said plurality of ranges of aspect ratios are predetermined to minimize the number of interleaving pixel patterns required to encompass the pixel data encompassed by said polygon shape; and selecting a shape of the interleaving pixel patterns from a plurality of interleaving patterns based upon said polygon shape of the data portion desired to be accessed.

14. A memory accessing apparatus for simultaneously accessing a plurality of addresses of a memory for pixel data storage utilizing a plurality of identical interleaving pixel patterns encompassing input coordinates of pixel data desired to be accessed, the memory accessing apparatus comprising:

inputting means for determining a polygon shape encompassing a portion of the input pixel data desired to be accessed;

accessing means for simultaneously accessing a plurality of addresses of the memory;

means for determining an aspect ratio of said polygon shape from coordinates of the data encompassed by said polygon shape;

means for providing a plurality of interleaving pixel patterns corresponding respectively to a plurality of ranges of aspect ratios, such that said interleaving pixel patterns corresponding respectively to said plurality of ranges of aspect ratios are predetermined to minimize the number of interleaving pixel patterns required to encompass the pixel data encompassed by said polygon shape; and control means for selecting a shape of the interleaving patterns that from a plurality of interleaving patterns based on said polygon shape of the input data portion desired to be accessed.

* * * * *

UNITED STATES PATENT AND TRADEMARK OFFICE
CERTIFICATE OF CORRECTION

PATENT NO. : 6,172,670 B1
DATED : Jan. 9, 2001
INVENTOR(S) : Masaaki Oka, Toshiyuki Hiroi It is certified that error appears in the above-identified patent and that said Letters Patent is hereby corrected as shown below:

Column 13, line 2, claim 7, change "on", to read --of--.

Column 13, line 4, claim 7, change "from", to read --form--.

Signed and Sealed this

Twenty-second Day of May, 2001

Attest:

NICHOLAS P. GODICI

*Attesting Officer*  *Acting Director of the United States Patent and Trademark Office*